United States Patent [19]
Tullis

[11] Patent Number: 6,102,552
[45] Date of Patent: *Aug. 15, 2000

[54] LASER-ARRAY BASED DIGITAL ILLUMINATOR

[75] Inventor: Barclay J. Tullis, Palo Alto, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/731,784

[22] Filed: Oct. 18, 1996

[51] Int. Cl.$^7$ ..................................................... G02B 5/32
[52] U.S. Cl. ........................... 362/249; 362/259; 362/252; 362/800; 362/235
[58] Field of Search ................................... 362/249, 252, 362/259, 235, 335, 800

[56] References Cited

U.S. PATENT DOCUMENTS

| | | | |
|---|---|---|---|
| 4,826,269 | 5/1989 | Streifer et al. | 362/800 |
| 4,893,223 | 1/1990 | Arnold | 362/800 |
| 5,065,188 | 11/1991 | Kobayashi et al. | 362/800 |
| 5,174,649 | 12/1992 | Alston | 362/800 |
| 5,289,082 | 2/1994 | Komoto | 362/800 |
| 5,477,436 | 12/1995 | Bertling et al. | 362/800 |
| 5,504,514 | 4/1996 | Nelson | 362/800 |
| 5,655,832 | 8/1997 | Pelka et al. | 362/800 |
| 5,786,582 | 7/1998 | Roustaei et al. | 235/462 |

Primary Examiner—Thomas M. Sember

[57] ABSTRACT

This invention is a power efficient illuminator and illumination method that provides control of spatial distributions of power density, ray angles, wavelength(s), polarization and temporal behavior (even coherence) to meet specific design specifications across a prescribed target zone (i.e., line, area or volume). This invention utilizes an array (or set) of radiant power or energy sources which can be selected or varied in kind(s), form(s), size(s) number and arrangement. Ancillary reflective, refractive or diffractive optical elements may be used for additional control. The ancillary optics may be one or more shared single optic or may be one or more entire array(s) of elements matched to the array of sources. The ancillary optics may be refractive or reflective, passive or active, self-focusing, or diffractive (e.g., holographic, binary or multistep). The set of individual sources are systematically distributed spatially, and driven individually or together. Each source in the set has a controlled divergence, each emitting a narrowly divergent beam with the beam axes aligned parallel to one another, aligned to converge at a common point, or aligned to diverge from a common (virtual) point. The individual source emitters comprising the set can either be all identical to one another or be made different from one another in a spatially graded way to meet design objectives for specific distribution patterns. The set of sources can be made up of an assembly of otherwise independent sources or all manufactured together in a monolithic array in a common manufacturing sequence (although perhaps with controlled process gradients). The set of sources can be configured in an array, regularly spaced to form a spatial grid, irregularly spaced, or in combination. In a preferred embodiment, the set of sources (emitters) is a monolithic array of vertical cavity surface emitting laser diodes.

26 Claims, 7 Drawing Sheets

LASER-ARRAY BASED DIGITAL ILLUMINATOR

BACKGROUND OF THE INVENTION

1. Field of the Invention

The present invention relates to illumination and, more particularly, to the use of coherent light sources as illuminators.

2. Description of the Related Art

The prior art of illumination system design includes many examples of illumination designs. There are broadly two different design approaches used when incoherent sources are used. The first approach is to use a single source with one or more optical elements to spread the available radiant power or energy over one or more target zones. In this first approach, significant trade-offs are made between various performance variables. Typically source size is increased to achieve greater radiance values at the expense of collimation. Lossy filters have to be used to achieve any desired spatial gradients in wavelength or polarization. Optics of various description have been added to shape the distribution of incident power, always with incumbent losses. Examples of implementations that use this design approach include flashlights, beacons, projectors, and desk lamps.

The second design approach using incoherent sources is to use more than a single source, often in combination with respective optics. Typically this approach is found only in large scale illumination systems such as an array of street lamps, banks of lamps used for drying painted surfaces, or the headlights on an automotive vehicle. Examples also exist of the use of multiple sources with a single optic such as an array of LEDs along the length of a cylindrical lens to form a strip of illumination as in a fax machine.

Unlike incoherent sources, lasers provide polarized monochromatic light with a spatial coherence that permits their output power to be efficiently directed with low beam divergence. However, a significant tradeoff is required if the illumination must provide uniform radiant incident power (irradiance) across a target zone. Such uniformity is typically achieved by wasting power outside the target zone, attenuating the brightest portions of the beam, and/or using holographic optical elements.

Unlike the many applications of multiple incoherent illumination sources, most applications of lasers have been designed around use of a single laser. One use of multiple laser beams converging into a common target zone simultaneously has been made at Lawrence Livermore National Laboratory, Livermore Calif., to compress a plutonium pellet in the creation of nuclear fusion. Multiple lasers are also popular in entertainment, but the objective there is to create a non-uniform and varying illumination field.

Thus, it can be seen that competing design constraints impose limits upon current-technology illumination devices and hinder the use of these devices in many applications.

Therefore, there is an unresolved need for an illumination device that will significantly improve energy and/or power efficiency of current-technology illuminators while enabling efficient control of performance variables throughout a prescribed target zone.

SUMMARY OF THE INVENTION

This invention is a power efficient illuminator and illumination method that provides control of spatial distributions of power density, ray angles, wavelength(s), polarization and temporal behavior (even coherence) to meet specific design specifications across a prescribed target zone (i.e., line, area or volume).

This invention is able to achieve power-efficient illumination and still achieve effective control of other performance variables by utilizing an array (or set) of radiant power or energy sources which can be selected or varied in kind(s), form(s), size(s) number and arrangement.

Ancillary reflective, refractive or diffractive optical elements may be used for additional control. The ancillary optics may be one or more shared single optic or may be one or more entire array(s) of elements matched to the array of sources. The ancillary optics may be conventional, refractive or reflective, passive or active, self-focusing, or diffractive (e.g., holographic, binary or multistep).

A set of individual sources are systematically distributed spatially, and driven individually or together. Each source in the set has a controlled divergence, each emitting a narrowly divergent beam with the beam axes aligned parallel to one another, aligned to converge at a common point, or aligned to diverge from a common (virtual) point.

The individual source emitters comprising the set can either be all identical to one another or be made different from one another in a spatially graded way to meet design objectives for specific distribution patterns.

The set of sources can be made up of an assembly of otherwise independent sources or all manufactured together in a monolithic array in a common manufacturing sequence (although perhaps with controlled process gradients).

The set of sources can be configured in an array, regularly spaced to form a spatial grid, irregularly spaced, or in combination. In a preferred embodiment, the set of sources (emitters) is a monolithic array of vertical cavity surface emitting laser diodes.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

The invention is a discrete means for realizing power-efficient, illumination-enabling, control of performance variables throughout a prescribed target zone. These performance variables include magnitudes and spatial gradients of incident radiant power and/or energy, ray angles, wavelength(s), polarization and temporal behavior (including coherence).

The subject invention is novel and particularly well suited to meet requirements for uniform or controlled-shape illumination in portable microscopic instruments or other opto-electronic products where power supply energy must be conserved while achieving uniform or controlled-shape illumination with a good degree of collimation. An example of where this set of requirements is encountered is the illumination of paper surface fibers to achieve a good spatial contrast for navigating displacements over textured and/or printed surfaces such as disclosed in U.S. Pat. No. 5,149,980.

In a medical context, when light or other radiant energy is being used to induce damage, a uniform source is desired in order to provide better control of the damage induced. Furthermore, in an inspection context, a uniform illumination is usually desired because non-uniform illumination can produce spots or other visual artifacts that confuse the observer. On the other hand, the present invention can also be used to provide a non-uniform illumination. Non-uniform illumination is desirable, for example, to illuminate a photographic film having an image that is being viewed or projected by a device that inherently introduces light transmission distortions across the image. In such a case, the non-uniform illumination can be used to compensate for the distortions of the viewing or projection device to yield an image that appears to have been uniformly illuminated.

Structure

Figure 1:
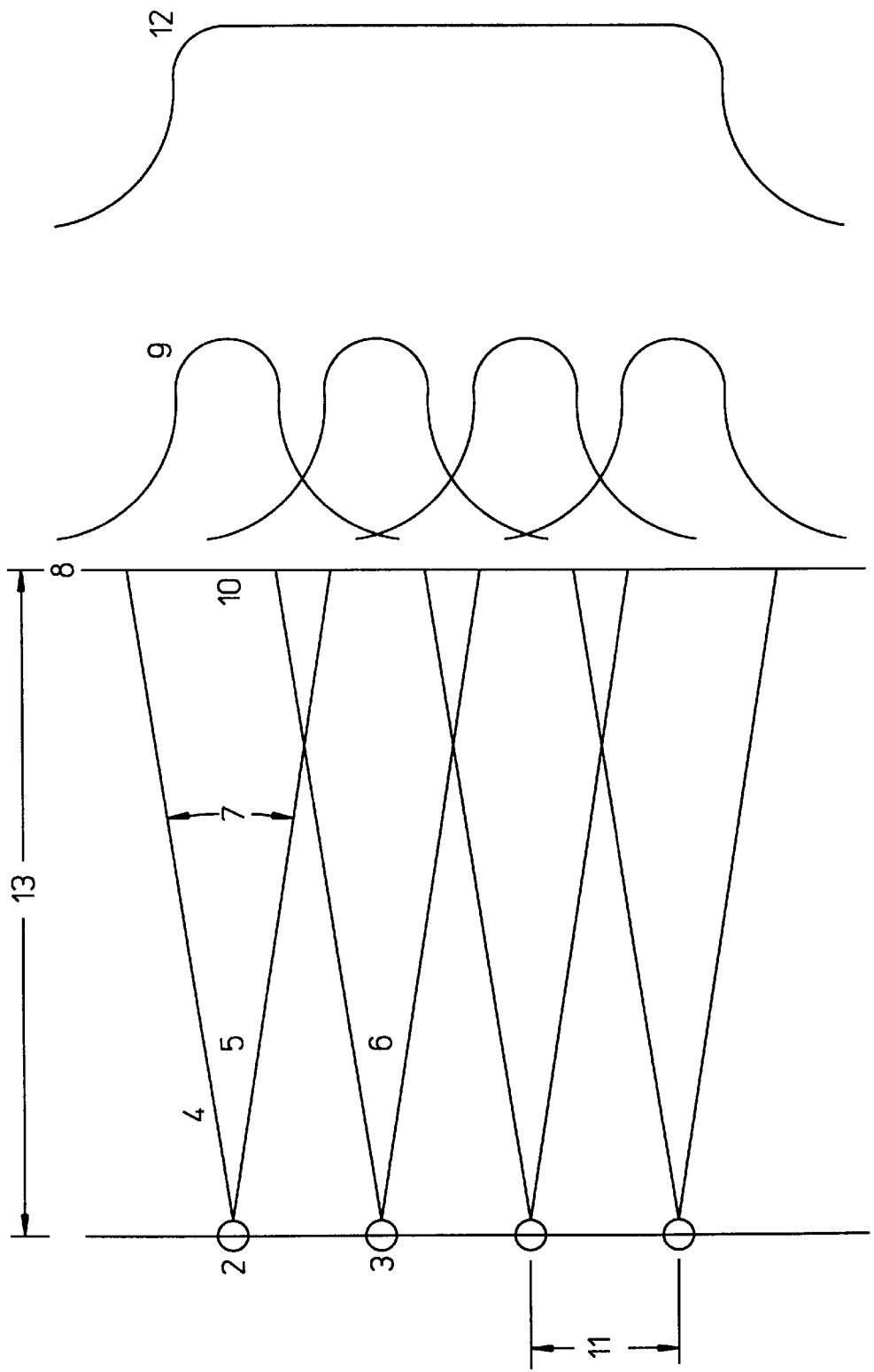
FIG. 1 is a side view of an illumination device constructed according to the present invention by employing multiple coherent light sources.

FIG. 1 is a side view of an illumination device constructed according to the present invention by employing multiple coherent light sources. FIG. 1 shows an array 1 of sources (e.g., 2, 3) of radiant energy. Rays 4 emit from these sources and are confined to narrow cones (e.g., 5, 6) whose half-angles 7 are one measure of beam divergence reaching the target zone 8. The distribution of radiant flux from any one source contributes to only one portion of the entire target zone 8. For example, the distribution 9 of radiant flux from source 5 only contributes to portion 10 of the entire target zone 8. Separation distances 11 lie between the individual sources. The target zone 8 is situated to intercept the power emitted from the sources. At the target zone, the net distribution 12 of radiant flux can be shaped by design through the control of a) the separation distances between the individual sources relative to the distances 13 separating the array of sources from the target zone, b) the amount of power emitted from each source, and c) the amount of divergence from each of the sources. The net flux at any point is equal to the sum of the fluxes reaching it from those sources whose divergence cones overlap that point.

For one embodiment, sources (e.g., 2, 3) of radiant energy are vertical cavity surface emitting laser diodes. Alternately, the sources are edge=emitting laser diodes. For yet another embodiment, the sources are quasi-coherent light sources, e.g., resonant cavity light emitting diodes. Moreover, embodiments may include heterogenous combinations of various light sources such as the above that have been selected to advantageously tailor array 1 to exploit unique features of the particular sources selected.

Figure 2:
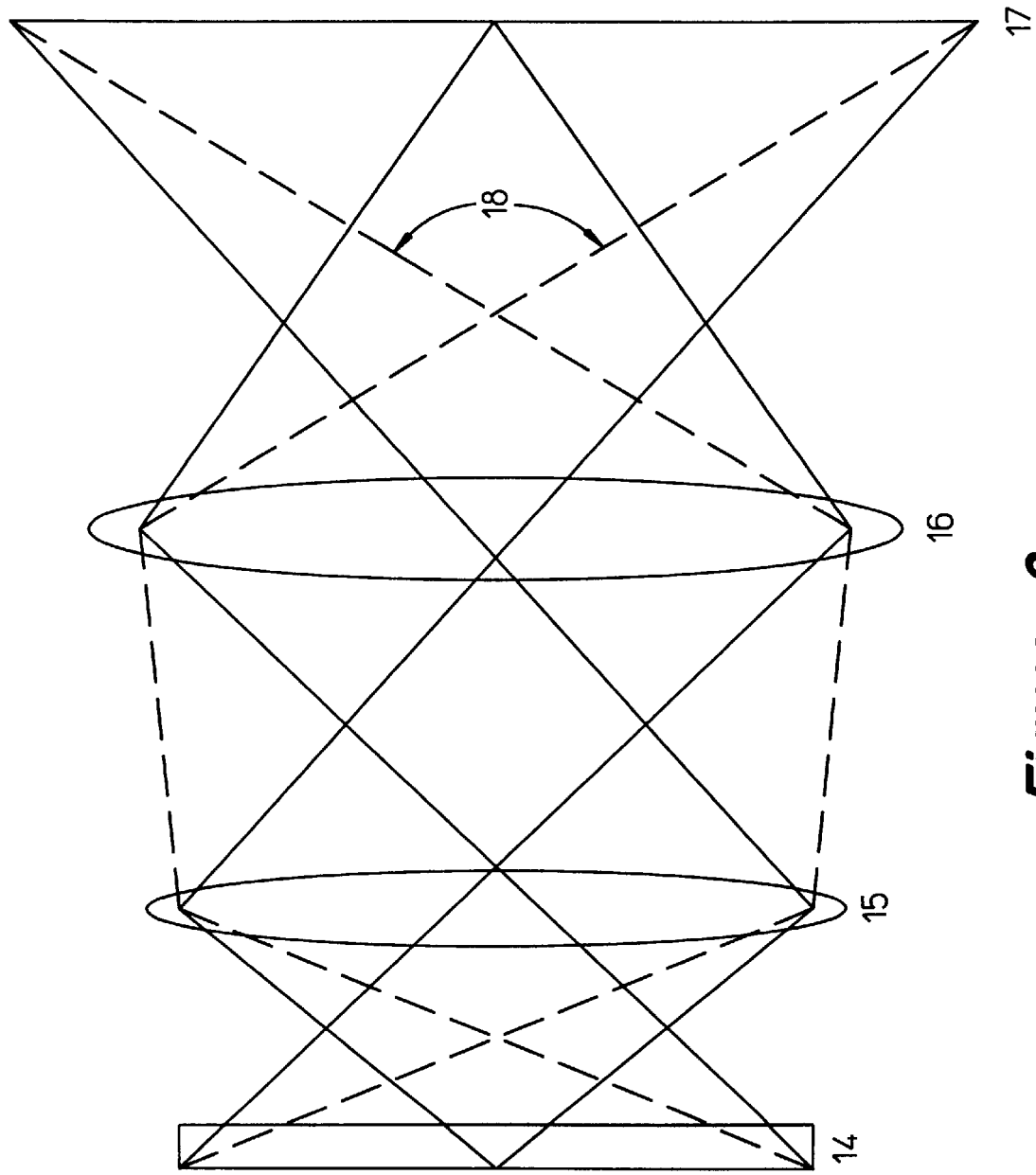
FIG. 2 is a side view of a prior art illumination device employing a single Lambertian light source and two optical elements.

FIG. 2 is a side view of a prior art illumination device employing a single Lambertian light source and two optical elements. The single Lambertian emitting surface 14 is imaged via a condensing lens 15 (or condensing lens system) into the pupil of a projection lens 16 (or projection lens system) which in turn images the pupil plane of the condensing lens onto a target screen 17. The range of angles 18 the rays of illumination have when measured at the target screen is that shown.

Figure 3:
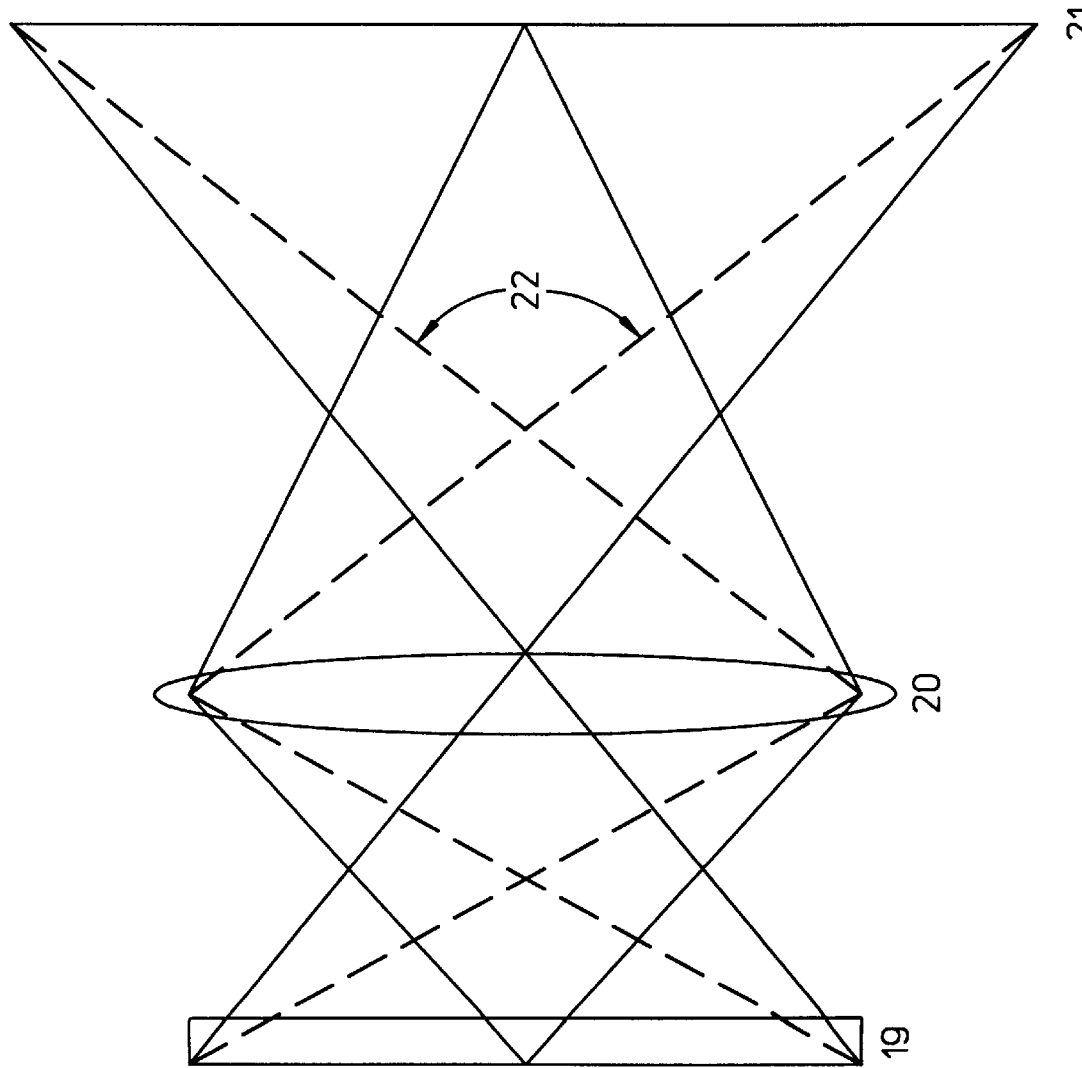
FIG. 3 is a side view of a prior art illumination device employing a single Lambertian light source and a single optical element.

FIG. 3 is a side view of a prior art illumination device employing a single Lambertian light source and a single optical element, wherein the source 19 is imaged directly onto the target screen 21 via a single lens 20 (or lens system). The range of angles 22 the rays of illumination have when measured at the target screen is that shown.

Figure 4:
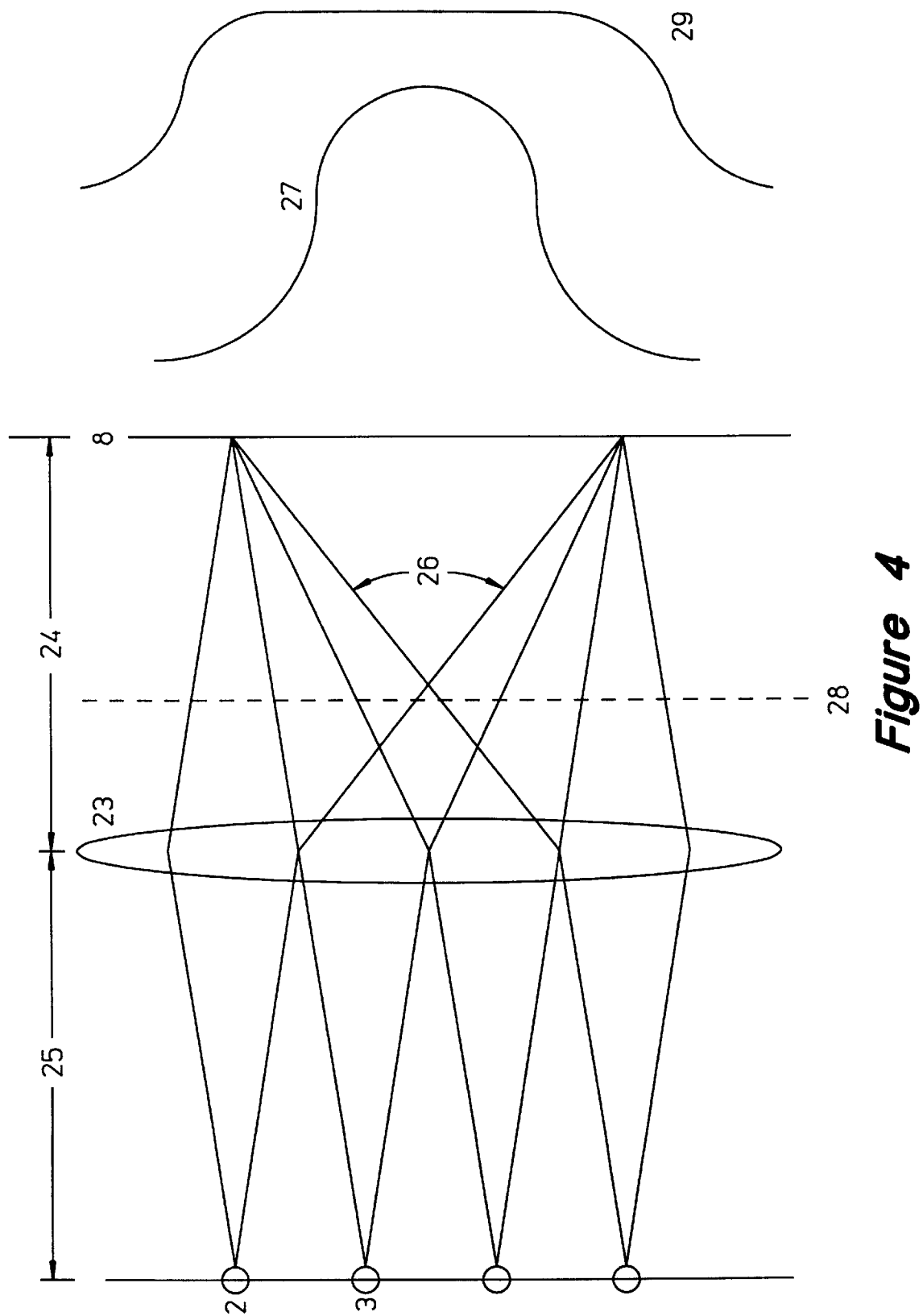
FIG. 4 is a side view of an illumination device having an optical element and that is constructed according to the present invention by employing multiple coherent light sources.

FIG. 4 is a side view of an illumination device having an optical element and that is constructed according to the present invention by employing multiple coherent light sources. FIG. 4 shows a configuration similar to that described in FIG. 1, with the exception that an auxiliary optic, a single lens 23 has been added between the laser array 1 and the target zone 8. This lens 23 (or lens system) is shown placed a distance 24 from the target zone 8. The distance 25 from the lens 23 and the laser array 1 is shown. The range of angles 26 the rays of illumination have when measured at the target screen 8 is that shown. The distribution 27 of power incident on the target zone 8 is shown to be similar to that shown (9) in FIG. 1, but with greater amplitude because it is a superposition of the multiple beams from the multiple sources in the array ). Such a distribution is typically Gaussian or nearly Gaussian in shape. Note, however, that if the target zone is moved to a position other than the focal plane of the lens 8, such as that shown by the straight dotted line 28, a distribution 29 can be formed that is much flatter throughout much of the illuminated region.

Operation

The functioning of the elements described in FIGS. 1 and 4 and the section on structure above is such that uniformity of illumination in the target zone can be realized by relative placement and separations of the sources within the array, and can be accomplished with or without refractive and/or reflective optics. This can be done with greater freedom than available using a single Lambertian source and refractive or reflective optics as in classical illuminators shown in FIGS. 2 and 3. Also the resulting digitally structured illumination is accomplished with an overall reduction in the range of incidence angles, achieving a greater degree of collimation when desired.

One net positive result is that the uniformity of incident radiant power density measured at the target can be made more uniform than would result if all of the sources were to be located immediately adjacent to one another, or as shown in FIG. 4 at target position 8, were to be imaged to overlap completely.

Figure 5:
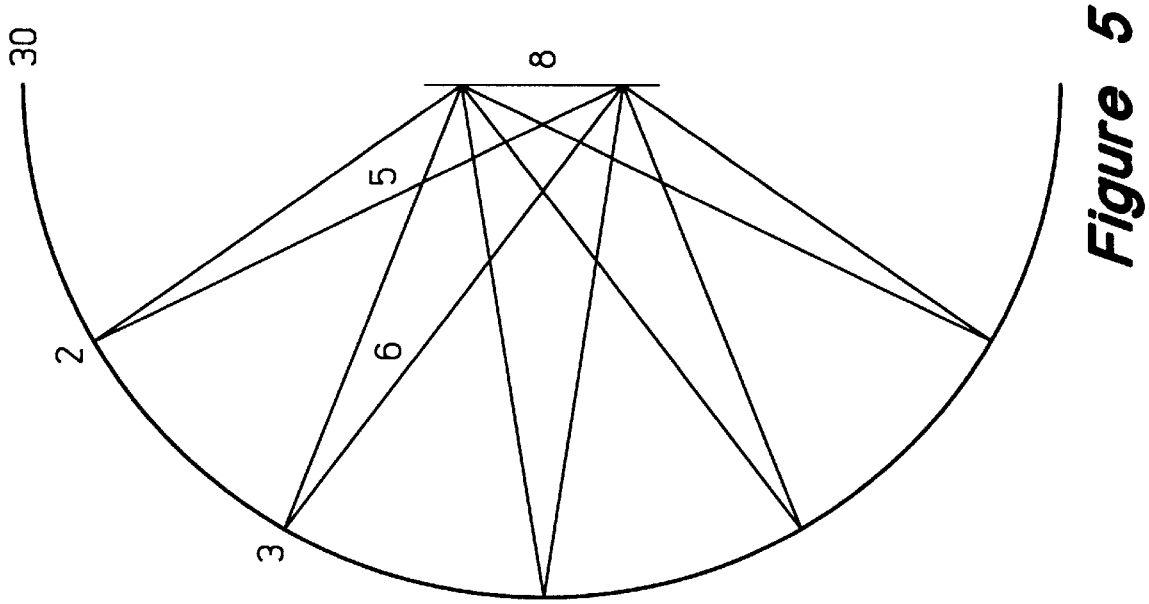
FIG. 5 is a side view of an illumination device constructed according to the present invention by employing multiple coherent light sources wherein the coherent light sources are distributed upon a spherical surface.

An alternate goal, depicted in FIG. 4, is to achieve a higher brightness or irradiance 27 than available from any one of the sources (e.g, FIG. 1, distribution 9). In FIG. 4, the individual sources in the array are imaged at the target area 8 to overlap one another as exactly as possible. Alternately, this could be done without the use of the lens by configuring the arrangement or array of sources in FIG. 1 to lie on a spherical surface whose center of curvature is the center of the target zone. FIG. 5 is a side view of such an illumination device constructed according to the present invention by employing multiple coherent light sources (e.g., 2, 3) wherein the coherent light sources are distributed upon a spherical surface 30 and directed to overlap at the target zone 8 surface at the center of curvature.

Alternately, in FIGS. 1 and 5, an array of lenses can be placed in alignment with the array of sources and placed to lie between the array of sources and the target zone in order to increase or decrease the divergence within each cone of illumination reaching the target from its respective source. Or, an array of prisms, with or without respective lenses, could be placed between a planar array of sources and a target to effect a similar spherical convergence of multiple beams onto the target.

In FIGS. 1, 4 and 5, the use of overlapped beams from multiple laser sources produces fields of illumination with reduced temporal coherence. This has the advantage of reducing speckle from the illuminated target.

Thus, it can be seen that an illumination device of the present invention is a power efficient illuminator having adequate control of spatial distributions of power density, ray angles, wavelength(s), polarization and temporal behavior (even coherence) generally to meet specific design specification across a prescribed target zone (line, area or volume). Many different embodiments of the illumination device of the present invention are possible. Generally, an illuminator according to the present invention achieves power-efficient illumination and effective control of other performance variables by utilizing an array (or set) of radiant power or energy sources which can be selected or varied in kind(s), form(s), size(s) number and arrangement.

Use of ancillary reflective, refractive or diffractive optical elements may be used for additional control. Ancillary optics may be one or more shared single optics or may be one or more entire array(s) of elements matched to the array of sources. Ancillary optics may be conventional, refractive or reflective, passive or active, self-focusing, or diffractive (e.g., holographic, binary or multistep).

The invention involves systematically distributing spatially, and driving individually or together, a set of individual sources. Each source in the set has a controlled divergence, each emitting a narrowly divergent beam with beam axes aligned parallel to one another, aligned to converge at a common point, or aligned to diverge from a common (virtual) point.

The individual source emitters comprising the set can either be all identical to one another or be made different from one another in a spatially graded way to meet design objectives for specific distribution patterns.

The set of sources can be made up of an assembly of otherwise independent sources or all manufactured together in a monolithic array in a common manufacturing sequence (although perhaps with controlled process gradients).

Figure 6:
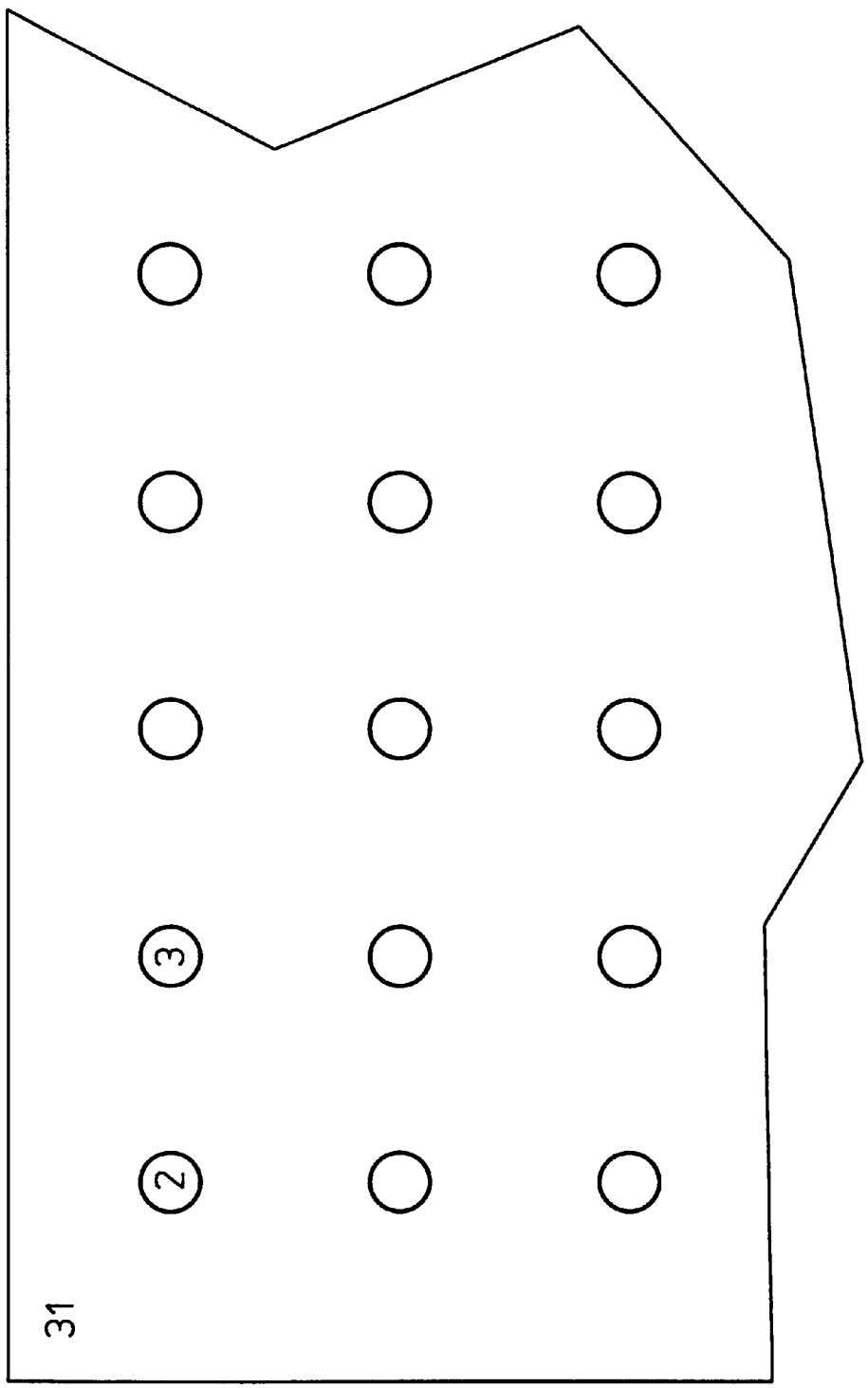
FIG. 6 is a top view of an illumination device constructed according to the present invention by employing multiple coherent light sources wherein the coherent light sources are uniformly distributed upon a lattice.
Figure 7:
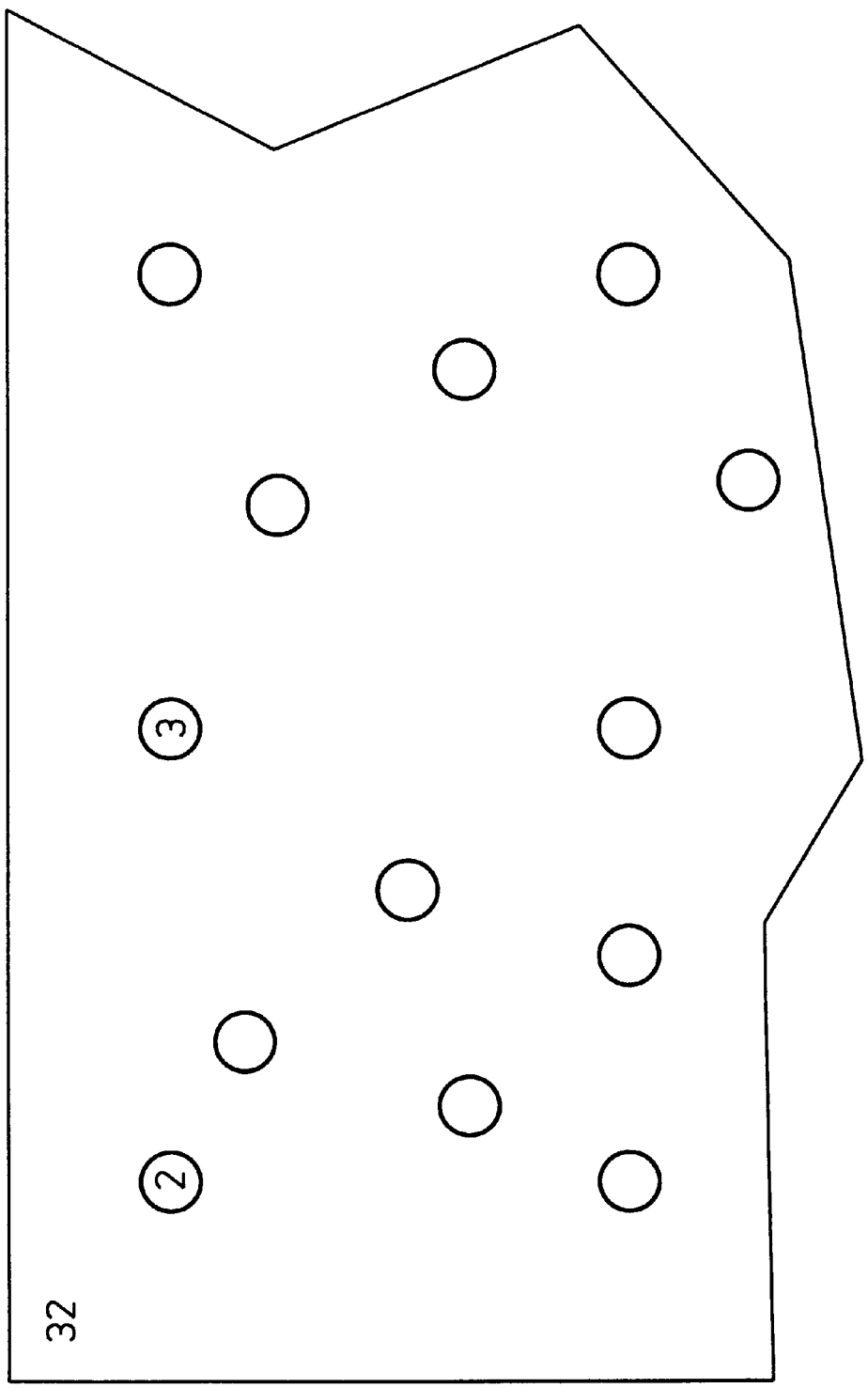
FIG. 7 is a top view of an illumination device constructed according to the present invention by employing multiple coherent light sources wherein the coherent light sources are non-uniformly distributed upon a lattice.

The set of sources can be configured in an array, irregularly spaced, regularly spaced to form a spatial grid, or in combination. FIG. 6 is a top view of an illumination device 31 constructed according to the present invention by employing multiple coherent light sources (e.g., 2, 3) wherein the coherent light sources are uniformly distributed upon a lattice. FIG. 7 is a top view of an alternate illumination device 32 constructed according to the present invention by employing multiple coherent light sources (e.g., 2, 3) wherein the coherent light sources are non-uniformly distributed upon a lattice. In a preferred embodiment, the set of sources (emitters) is a monolithic array of surface emitting laser diodes.

The design of such arrays of sources and their possible ancillary optics include the choice of individual and relative values of the design parameters. Such parameters include:
a) separation distances between individual sources in one, two or three dimensions;
b) the sizes, shapes and orientations of individual sources;
c) the number of sources and the shape of the overall array; and
d) absolute and relative values of output powers, direction of central beam axes (and divergence, convergence or ray angles in general), wavelength, polarization and temporal behavior (even coherence).

All of these parameters can be selected or controlled to meet a composite specification for illumination across a target zone.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An illumination apparatus, comprising:
   a plurality of light sources, spatially arranged in an array, each light source of the plurality for emitting coherent light rays confined to an associated region and directed towards a target zone,
   wherein, when emitting the light rays, the associated region of each light source at least partially overlaps the associated region of at least one different light source at a portion of the target zone and the illumination of the target zone provides substantially uniform radiant power incident to the target zone without scanning the light rays.

2. The apparatus as set forth in 1, wherein the light sources are not mutually coherent.

3. The apparatus as set forth in 1, wherein the light rays from the light sources combine to form a substantially collimated illumination of the target zone.

4. The apparatus as set forth in 1, wherein the light sources are lasers.

5. The apparatus as set forth in 1, further comprising an optical element positioned between a particular one light source of the plurality of light sources and the target zone to provide control of the light emitted from the particular one light source.

6. The apparatus as set forth in 5, wherein the optical element provides control of light emitted from at least one light source of the plurality of light sources other than the particular one light source.

7. The apparatus as set forth in 1, wherein the array is a planar lattice.

8. The apparatus as set forth in 1, wherein the array is a lattice located upon a portion of a sphere.

9. The apparatus as set forth in 1, wherein the light sources are distributed about the array to form a uniformly spaced light source lattice.

10. The apparatus as set forth in 1, wherein the light sources are distributed about the array to form a non-uniformly spaced light source lattice.

11. The apparatus as set forth in 1, wherein the light sources are resonant cavity light emitting diodes.

12. The apparatus as set forth in 1, further comprising a prism positioned between a particular one light source of the plurality of light sources and the target zone to direct the light emitted from the particular one light source to the target zone.

13. An illumination method, comprising the steps of:

emitting light rays from each of a plurality of light sources spatially arranged in an array, each light source of the plurality emitting coherent light rays confined to an associated region and directed towards a target zone, wherein, when emitting the light rays, the associated region of each light source at least partially overlaps the associated region of at least one different light source at a portion of the target zone and the illumination of the target zone provides substantially uniform radiant power incident to the target zone without scanning the light rays.

14. The method as set forth in 13, wherein the light sources are not mutually coherent.

15. The method as set forth in 13, wherein the light rays from the light sources combine to form a substantially collimated illumination of the target zone.

16. The method as set forth in 13, wherein the light sources are lasers.

17. The method as set forth in 13, further comprising the step of providing control of the light emitted from a particular one light source of the plurality of light sources using an optical element positioned between the particular one light source and the target zone.

18. The method as set forth in 17, further comprising the step of using the optical element to provide control of light emitted from at least one light source of the plurality of light sources other than the particular one light source.

19. The method as set forth in 13, wherein the array is a planar lattice.

20. The method as set forth in 13, wherein the array is a lattice located upon a portion of a sphere.

21. The method as set forth in 13, wherein the light sources are distributed about the array to form a uniformly spaced light source lattice.

22. The method as set forth in 13, wherein the light sources are distributed about the array to form a non-uniformly spaced light source lattice.

23. The method as set forth in 13, further comprising the step of using a prism positioned between a particular one light source of the plurality of light sources and the target zone to direct the light emitted from the particular one light source to the target zone.

24. The method as set forth in 13, wherein the light sources are resonant cavity light emitting diodes.

25. An illumination apparatus, comprising:

a plurality of light sources, spatially arranged in an array, each light source of the plurality for emitting coherent light rays confined to an associated region and directed towards a planar target zone, wherein, when emitting the light rays, the associated region of each light source at least partially overlaps the associated region of at least one different light source at a portion of the planar target zone thereby reducing speckle from an illuminated target within the planar target zone without scanning the light rays.

26. An illumination method, comprising the steps of:

emitting light rays from each of a plurality of light sources spatially arranged in an array, each light source of the plurality emitting coherent light rays confined to an associated region and directed towards a planar target zone, wherein, when emitting the light rays, the associated region of each light source at least partially overlaps the associated region of at least one different light source at a portion of the planar target zone thereby reducing speckle from an illuminated target within the planar target zone without scanning the light rays.

* * * * *